United States Patent
Dalal et al.

(10) Patent No.: US 7,903,546 B2
(45) Date of Patent: Mar. 8, 2011

(54) DETECTING UNAVAILABLE NETWORK CONNECTIONS

(75) Inventors: Mitesh Dalal, Santa Clara, CA (US); Anantha Ramaiah, Sunnyvale, CA (US); Ruchi Kapoor, Santa Clara, CA (US); Chandrashekhar Appanna, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 11/036,191

(22) Filed: Jan. 14, 2005

(65) Prior Publication Data

US 2006/0159011 A1 Jul. 20, 2006

(51) Int. Cl.
*H04L 1/22* (2006.01)
(52) U.S. Cl. .......................................... 370/221; 709/223
(58) Field of Classification Search .......... 709/223–226; 370/216, 229, 235, 351
See application file for complete search history.

(56) References Cited

U.S. PATENT DOCUMENTS

| | | | |
|---|---|---|---|
| 5,506,905 A | 4/1996 | Markowski et al. | |
| 5,519,704 A * | 5/1996 | Farinacci et al. | 370/402 |
| 6,018,530 A * | 1/2000 | Chakravorty | 370/471 |
| 6,154,463 A * | 11/2000 | Aggarwal et al. | 370/408 |
| 6,173,324 B1 | 1/2001 | D'Souza | |
| 6,826,613 B1 | 11/2004 | Wang et al. | |
| 7,003,574 B1 * | 2/2006 | Bahl | 709/228 |
| 7,076,555 B1 * | 7/2006 | Orman et al. | 709/227 |
| 7,100,070 B2 * | 8/2006 | Iwamura et al. | 714/4 |
| 7,330,891 B2 * | 2/2008 | Yodaiken | 709/224 |
| 2002/0112073 A1 * | 8/2002 | MeLampy et al. | 709/240 |
| 2002/0114282 A1 * | 8/2002 | MeLampy et al. | 370/238 |
| 2002/0165949 A1 * | 11/2002 | Na et al. | 709/223 |
| 2003/0223357 A1 * | 12/2003 | Lee | 370/218 |
| 2004/0034773 A1 | 2/2004 | Balabine et al. | |
| 2004/0062246 A1 * | 4/2004 | Boucher et al. | 370/392 |
| 2004/0081154 A1 * | 4/2004 | Kouvelas | 370/392 |
| 2004/0193728 A1 * | 9/2004 | Doshi et al. | 709/238 |
| 2004/0210663 A1 * | 10/2004 | Phillips et al. | 709/230 |
| 2004/0249966 A1 | 12/2004 | Asazu et al. | |
| 2005/0013246 A1 * | 1/2005 | Miyake et al. | 370/230 |
| 2005/0135233 A1 * | 6/2005 | May | 370/216 |
| 2005/0163044 A1 | 7/2005 | Haq et al. | |
| 2005/0201279 A1 * | 9/2005 | Tan et al. | 370/229 |
| 2006/0013210 A1 * | 1/2006 | Bordogna et al. | 370/389 |
| 2006/0062142 A1 * | 3/2006 | Appanna et al. | 370/219 |

(Continued)

OTHER PUBLICATIONS

CISCO, "Border Gateway Protocol (BGP)," Internetworking Technology Overview, Jun. 1999, Chapter 35, pp. 1-8.

(Continued)

*Primary Examiner* — Aung S Moe
*Assistant Examiner* — Curtis A Alia
(74) *Attorney, Agent, or Firm* — Hickman Palermo Truong & Becker LLP (57) ABSTRACT

A method for detecting unavailable network connections comprises, at a first data processing node that is hosting a transport protocol connection that uses a plurality of sequence values to identify messages sent to a peer node, wherein the first node is communicatively coupled to a second data processing node serving as a redundant backup, periodically sending a checkpoint sequence value to the second node; detecting that either the transport protocol connection or a process using the transport protocol connection is unavailable, without use of a timeout; and in response thereto, sending a notification to the peer node, wherein the notification includes the checkpoint sequence value. One embodiment provides for rapidly detecting and responding to failure of a TCP process without using long timeouts as conventionally provided in long-lived applications that run on top of TCP.

44 Claims, 6 Drawing Sheets

U.S. PATENT DOCUMENTS

2006/0072480 A1* 4/2006 Deval et al. .................. 370/254
2006/0126502 A1* 6/2006 Vasseur et al. ............... 370/221
2006/0253575 A1* 11/2006 Carter et al. ................. 709/224
2007/0248108 A1 10/2007 Visser et al.

OTHER PUBLICATIONS

CISCO, "Configuring BGP," Network Protocols Configuration Guide, Part 1, Oct. 2004, PIC 157-161 and 184-185.

* cited by examiner

Fig. 3A (INITIAL ESTABLISHMENT OF CHECKPOINT SEQUENCE NUMBER)

Fig. 3B (WINDOW MOVES FORWARD, NO CHECKPOINT PERFORMED)

FIG. 5

DETECTING UNAVAILABLE NETWORK CONNECTIONS

CROSS-REFERENCE TO RELATED APPLICATIONS

This application is related to prior application Ser. No. 10/888,122, filed Jul. 9, 2004, "Rapid Protocol Failure Detection," of Chandrashekhar Appanna et al., assigned to the same assignee as the present application.

FIELD OF THE INVENTION

The present invention generally relates to network communication protocols. The invention relates more specifically to techniques for rapidly detecting the unavailability of a transport protocol connection.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a network protocol used in packet-switched networks for exchanging routing information between gateway hosts (each with its own router) in a network of autonomous systems. Routers employing BGP interact with peers by establishing Transmission Control Protocol (TCP) connections. A router may be peered with another router in another domain using External Border Gateway Protocol (EBGP) or with another router within a domain using Internal Border Gateway Protocol (IBGP). In either case, current implementations of BGP often enable the TCP property called RETRANSMIT_FOREVER, which is used to block TCP from tearing down the session even if there is data in the TCP retransmit queue and retransmissions are failing.

One problem with use of RETRANSMIT_FOREVER is that when the retransmission queue becomes empty, such "idle" sessions are not torn down. These idle sessions continue to exist, using up resources to track and maintain them.

One approach to addressing this issue is to provide an application level "keepalive" mechanism to detect session related problems that require the session to be terminated. This mechanism terminates a session when a specified number of successive KEEPALIVE messages are lost. In other words, if no KEEPALIVE message is received for the duration of a specific period of time, called the hold time, the session is terminated. The values of KEEPALIVE time and hold time are configurable. The default is 60 seconds for keepalive time and 180 seconds for hold time.

Unfortunately, this approach has disadvantages. In order to quickly detect peer BGP application failures, many network administrators set the hold time and the keepalive time to values in the order of a few seconds. In today's high-speed networks, however, both the defaults and the retuned values that are in the order of seconds are very long times. Thus, even with re-tuning these values to the order of seconds, the idle sessions continue to place a large burden on BGP implementations in terms of processing power and scalability of the number of BGP sessions that a router can support.

Based on the foregoing, there is a clear need for a mechanism that will enable detection of session failures with improved speed relative to conventional techniques. There is also a need for a failure detection mechanism that will not adversely affect BGP scalability.

For example, if a failure occurs in a first BGP process, TCP process, or in the network element that is hosting the BGP and TCP processes, a second BGP process (or BGP "peer") is required to re-calculate route information and potentially notify other peers so that all peers converge on the same routing information. In conventional practice, the second BGP process becomes aware of the failure only after not receiving a KEEPALIVE message from the first BGP process within a specified time period. Typically, BGP peer can identify a failure no sooner than 60 seconds after the failure occurs.

While determining failure in 60 seconds was acceptable in early network deployments, modern networks require far faster detection and recovery when connections, processes or nodes are unavailable. The timeout interval could be shortened substantially, e.g., to one second. However, this approach would not scale in networks that have thousands of peers because the network becomes clogged with too many messages.

In large networks that consist of thousands of network elements hosting BGP, a 60-second delay is unacceptable. In combination with the time required for convergence following a failure, the time delay introduced using a conventional timeout approach is not fast enough. Thus, there is a need for a better way to detect when a protocol failure has occurred in a network element.

The use, in protocols such as TCP, of sequence numbers to reliably track and deliver data segments, creates a related problem. Specifically, in a redundant network element that has an active processor and a standby or backup processor, an approach is needed for providing an accurate sequence number to the standby processor so that the standby processor can take over the connection for the active processor.

One approach to this problem is disclosed in prior application Ser. No. 10/888,122, filed Jul. 9, 2004, "Rapid Protocol Failure Detection," of Chandrashekhar Appanna et al., assigned to the same assignee as the present application ("Appanna et al."). The disclosure of Appanna et al. addresses a scenario in which a TCP SYN segment carries a sequence number that does not fall within the allowed window. A restarting peer learns the sequence number that will be acceptable to the peer by soliciting a TCP ACK segment for the earlier SYN, which carries an acknowledgment value, and then generating a RST segment that will carries the acknowledgment value as the sequence number. Hence a total of three segments are required, which delays notification about a protocol failure. The amount of delay is directly proportional to the round-trip time of the link on which the traffic is sent, and also causes extra traffic to be generated.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for detecting unavailable network connections is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 GENERAL OVERVIEW

The needs identified in the foregoing Background, and other needs and objects that will become apparent for the following description, are achieved in the present invention, which comprises, in one aspect, a method for detecting unavailable network connections comprising, at a first data processing node that is hosting a transport protocol connection that uses a plurality of sequence values to identify messages sent to a peer node, wherein the first node is communicatively coupled to a second data processing node serving as a redundant backup, periodically sending a checkpoint sequence value to the second node; detecting that either the transport protocol connection or a process using the transport protocol connection is unavailable, without use of a timeout; and in response thereto, sending a notification to the peer node, wherein the notification includes the checkpoint sequence value.

In one feature, the checkpoint sequence value is initially set equal to a maximum sequence value allowed for a window of sequence values associated with the transport protocol connection. In another feature, the method involves determining that a sent-unacknowledged sequence value identifying a lowest sequence value of data sent on the transport protocol connection but unacknowledged by the peer node is greater than the checkpoint sequence value; only in response thereto, updating the checkpoint sequence value to a then-current maximum sequence value allowed for a window of sequence values associated with the transport protocol connection, and sending the updated checkpoint sequence value to the second node.

According to another feature, the transport protocol connection is a Transmission Control Protocol (TCP) connection, and wherein the process using the transport protocol connection is a Border Gateway Protocol (BGP) process. In one related feature, the method further comprises determining that a SND.UNA value is greater than the checkpoint sequence value; in response thereto, updating the checkpoint sequence value is updated to a SND.MAX value associated with the transport protocol connection.

In another feature, sending a notification comprises sending a TCP RST segment from the second node to the peer node, wherein the TCP RST segment includes the checkpoint sequence value as the sequence value of the TCP RST segment.

In yet another feature, the detecting step is performed at the second node by periodically sending heartbeat messages from the second node to the first node. In still another feature, the first node hosts a plurality of transport protocol connections, and the steps are performed only for one or more of the transport protocol connections that are marked for a fast notification capability.

In a further feature, sending a checkpoint sequence value to the second node further comprises sending a source network address value, source port value, destination address value, and destination port value in association with the checkpoint sequence value to the second node.

In other aspects, the invention encompasses a computer apparatus and a computer-readable medium configured to carry out the foregoing steps.

2.0 STRUCTURAL AND FUNCTIONAL OVERVIEW

Figure 1:
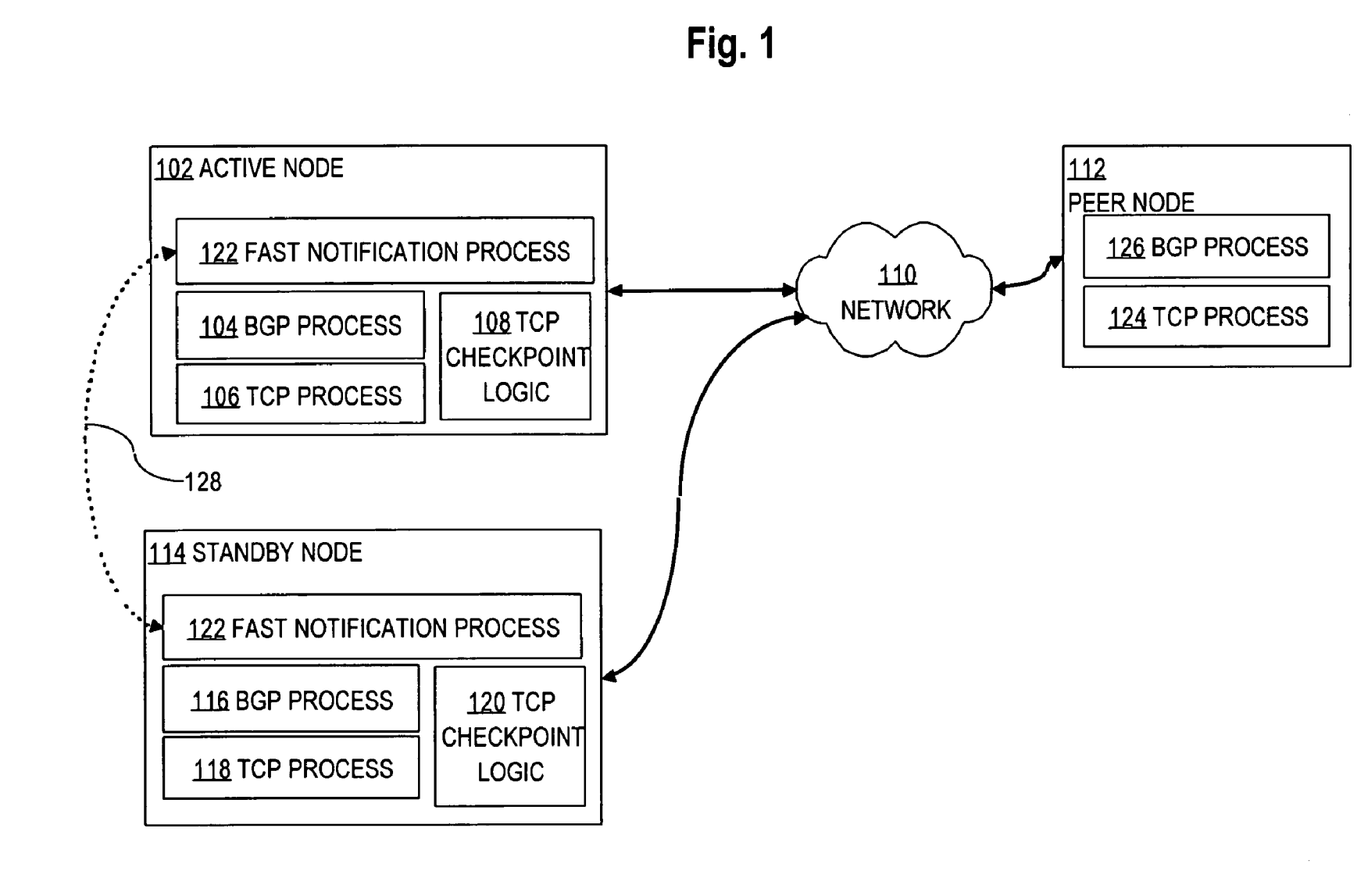
FIG. 1 is a simplified block diagram of a network that may be used to implement the techniques herein.

FIG. 1 is a simplified block diagram of a network that may be used to implement the techniques herein.

An active node 102, standby node 114, and peer node 112 are communicatively coupled to or form elements of a network 110. In one aspect of operation, the active node 102 and peer node 112 are configured as BGP peers and exchange BGP information. Standby node 114 acts as a redundant backup for the active node 102. In one embodiment, active node 102 and standby node 114 may be integrated into one network element. For example, an embodiment may use the Cisco 7500 Series routers, from Cisco Systems, Inc., San Jose, Calif., which provide active and standby route processors.

While the invention is illustrated generally with reference to an example of peered router devices supporting BGP over TCP sessions deployed in a network environment, the present invention does not require such implementation, and in some embodiments, the techniques herein may be implemented for other protocols or in other types of peered devices, such as a DSL modem, a cable modem, a router, a wireless access point or various combinations thereof.

Active node 102 hosts a TCP process 106, BGP process 104, and TCP checkpoint logic 108. TCP process 106 implements the TCP protocol and may form part of a TCP/IP stack. BGP process 104 implements the BGP protocol. TCP checkpoint logic 108 implements the techniques described herein for storing and using checkpoint instances of TCP sequence values. The TCP process 106, BGP process 104, and TCP checkpoint logic 108 may be integrated together, and one or more of them may be integrated into an operating system that the active node 102 hosts.

Standby node 114 also hosts a fast notification process 122, BGP process 116, TCP process 118, and TCP checkpoint logic 120. Thus the standby node is configured in the same way as active node 102 and is prepared to take over TCP connections to peer node 112 if active node 102 fails. The standby node 114 and active node 102 can exchange roles and responsibility for TCP connections any number of times.

Further, using the techniques herein, the fast notification processes 122 of active node 102 and standby node 114 form a logical connection as indicated by arrow 128. Thus communication between the standby node 114 and active node 102 is streamlined by performing all communications through connection 128. Alternatively, the fast notification process 122 on the active node 102 can poll the local BGP process 104 and TCP process 106 and, upon detecting that one of the processes is unavailable, the fast notification process 122 of the active node 102 can inform the fast notification process 122 of the standby node 114.

Peer node 112 hosts a BGP process 126 and TCP process 124 that interact with BGP process 104 and TCP process 106, respectively, to perform communications under the BGP and TCP protocols.

BGP processes 104, 116, 126 of FIG. 1 are shown merely as examples of applications that can use the general techniques described herein. The approach herein is applicable to any long-lived application that runs logically on top of another protocol, such as TCP or another transport protocol, for example. In other embodiments, processes 104, 116, 126 could be Label Distribution Protocol (LDP) processes or Multicast Source Discovery Protocol (MSDP) processes.

Figure 2:
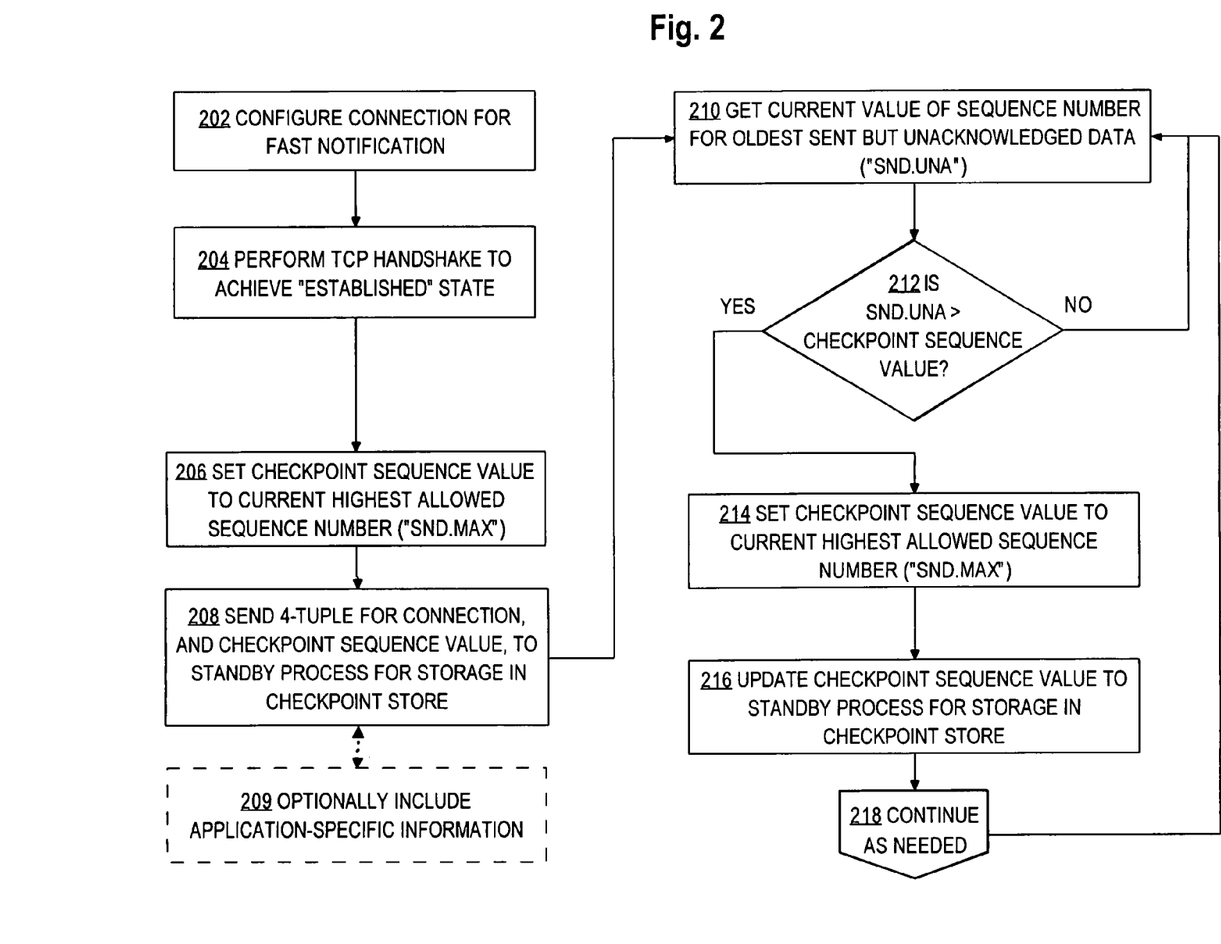
FIG. 2 is a flow diagram of one embodiment of a method of detecting and responding to a transport protocol connection that is unavailable.
Figure 3A:
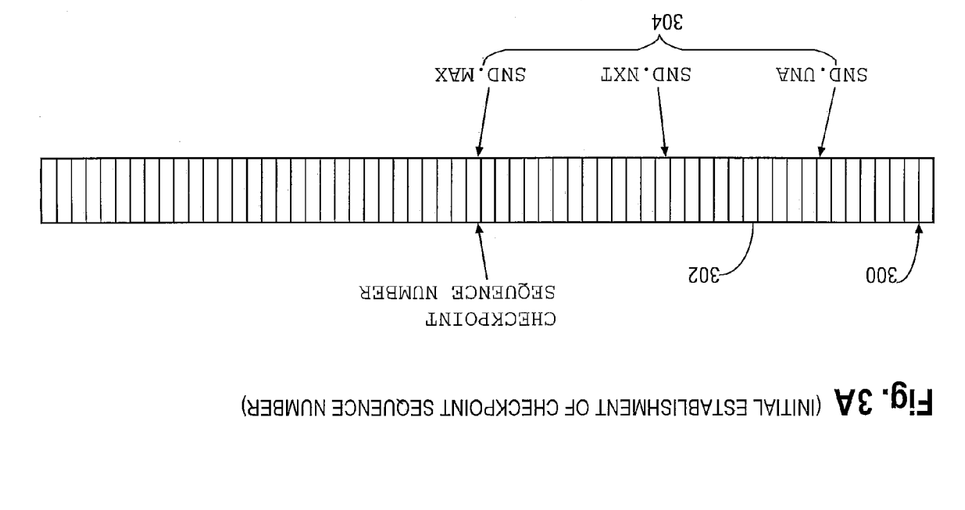
FIG. 3A, FIG. 3B, FIG. 3C are block diagrams of sequence values illustrating an approach for saving checkpoints of sequence values.
Figure 3B:
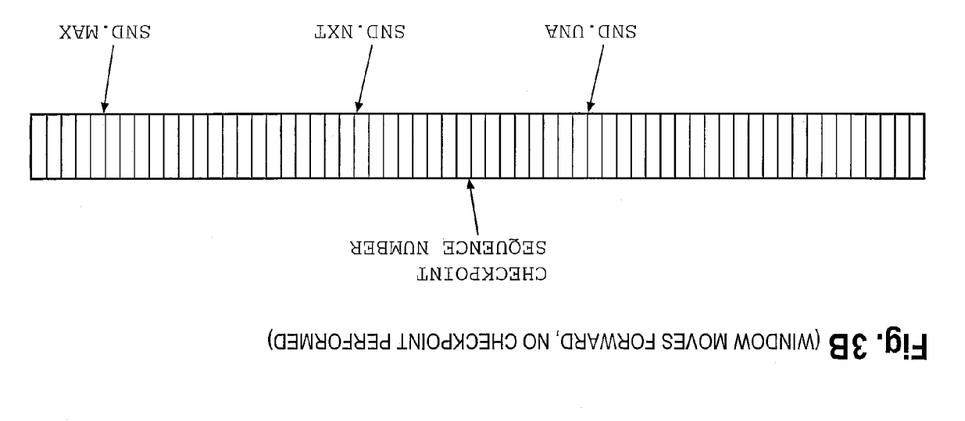
Figure 3C:
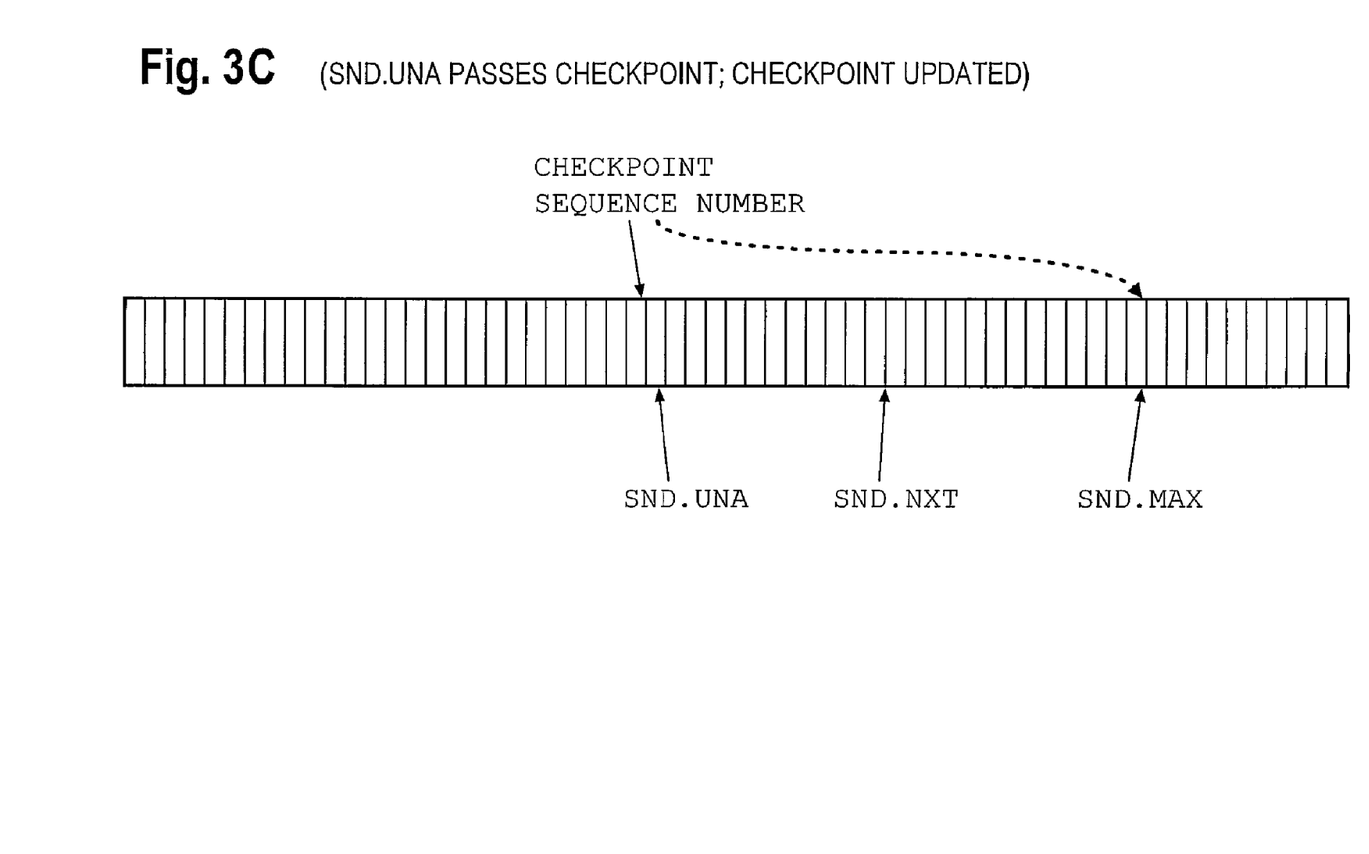

FIG. 2 is a flow diagram of one embodiment of a method of detecting and responding to a transport protocol connection that is unavailable. FIG. 3A, FIG. 3B, FIG. 3C are block diagrams of sequence values illustrating an approach for saving checkpoints of sequence values. For purposes of illustrating a clear example, FIG. 2 and FIG. 3A-3C are described with reference to an implementation that uses TCP as a transport protocol in the context of the system of FIG. 1. The approaches may be used with any application or process running on TCP or another transport protocol. However, in other embodiments the general techniques represented in FIG. 2 and FIG. 3A-3C may be adapted to or used with any other communication protocol and any kind of connection or application for which there is a need to rapidly detect unavailability. Thus, FIG. 2 and FIG. 3A-3C represent just one example method of implementation for one particular protocol.

At step 202, a connection is configured for fast notification using the techniques herein. Such configuration may involve, for example, marking or flagging a data structure associated with the connection to indicate that fast notification should be used with the connection. In an embodiment in which the transport protocol is TCP, step 202 may involve marking the TCB (transmission control block) for the connection with a flag value indicating that fast notification is in use for that connection. Conventional TCP implementations provide a TCB for each connection that represents the connection and stores parameter values relating to the connection. In the approach herein, the TCB is supplemented with a flag value or other marker indicating that a fast notification technique is used for that connection.

In step 204, for a TCP embodiment, conventional TCP handshake steps are performed to result in placing the connection in the ESTABLISHED state as defined in the TCP standard, RFC 793. Thus, the approach herein is typically performed for connections that are successfully established, regardless of the protocol that is used.

In step 206, a checkpoint sequence value is set equal to the current highest allowed sequence number for the connection. In some TCP implementations, the highest allowed sequence number for a connection is designed "snd.max" in program code or other software elements. The checkpoint sequence value referenced in FIG. 2 is a new value defined in the techniques herein and also may be termed an update checkpoint marker or UCM. Storing such an allowed sequence number as a checkpoint value enables the standby node to present a valid sequence number to the peer node later if the standby node takes over the connection between the active node and the peer node.

Step 206 may be understood more fully by referring now to FIG. 3A, in which a sequence number space 300 is shown as a crosshatched block having cells 302 that represent individual sequence numbers. A TCP sequence number window 304 is defined by a value denoted "snd.una" and the "snd.max" value. The lower bound of the window is equal to the sequence number for the oldest data that has been sent but not yet acknowledged by the peer. For example, the value is a sequence number for the oldest data that active node 102 has sent to peer node 112 but that the peer node has not yet acknowledged. In some TCP implementations, the value obtained in step 210 is denoted "snd.una". Within the window 304, "snd.nxt" designates the sequence number that the TCP process 106 of the active node 102 will use for the next data that it sends to the peer node 112. Step 206 involves, in one embodiment, initially setting the checkpoint sequence value equal to "snd.max".

In step 208, a four-tuple of values identifying the TCP connection, and the checkpoint sequence value or UCM, are sent to the standby process for storage in a checkpoint store. The checkpoint store may be any form of data storage in the standby node 114, such as a data structure established in main memory, non-volatile memory, etc. The four-tuple may comprise a source network address, source port number, destination network address, and destination port number that collectively uniquely identify a connection. Thus step 208 involves storing a snapshot of information that identifies a connection, as well as a sequence number within the allowed window of sequence numbers for the connection. Using this information, the standby node 114 is able to take over the connection if the active node 102 fails.

As indicated at step 209, optionally step 208 can include sending application-specific information to the checkpoint store. For example, in an implementation in which BGP runs over TCP, step 208 can involve sending a value that is used to authenticate a connection, such as a shared secret, hash value or other authenticator, to the checkpoint store. BGP applications that use MD5 hashes for authentication functions can checkpoint the MD5 hash value, for example. The application-specific information is sent to the checkpoint store only if that information is used for the associated connection.

The optional information also can include acknowledgment (ACK) values as used in TCP. Presently, an implementation of TCP in compliance with RFC 793 performs validation of RST segments only by verifying the sequence number of an incoming segment. However, in the future, changes in the TCP standard may require validating ACK values also. If such changes occur, placing ACK values in the checkpoint store at step 208 will enable the approach herein to have continued compatibility with TCP implementations.

In step 210, the process of FIG. 2 obtains a current value of the sequence number for the oldest data that has been sent but not yet acknowledged by the peer. For example, the value is the "snd.una" value. Step 210 can be implemented, for example, by fast notification process 122 issuing a call to TCP process 106, by the fast notification process retrieving the value from shared memory, or any other suitable means.

In step 212, the process of FIG. 2 tests whether the "snd.una" value is greater than the checkpoint sequence value. If so, then in step 214, the checkpoint sequence value is set equal to the then current highest allowed sequence number, or "snd.max".

In step 216, the checkpoint sequence value is updated or sent to the standby process for storage in the checkpoint store that was used at step 208. The particular technique used for updating at step 216 is not critical. For example, in one embodiment, the four-tuple of TCP connection values is stored in the checkpoint store each time that step 216 is performed. Alternatively, the standby node 114 can return a key that uniquely identifies the connection for use in subsequent checkpoint store operations. As an example, a 32-bit timestamp value could be used as a key. This approach would reduce the amount of time used in looking up the connection at the standby node, and reduces the amount of data sent across a backplane of a host that includes both active node 102 and standby node 114.

At step 218, the process continues as needed, while the active node 102 continues to communicate data to the peer node 112.

The effect of steps 210-214 is to determine whether the sequence number window for the current TCP connection has moved forward so that the lower bound of the window is past the last checkpoint sequence number that was stored in the checkpoint store. FIG. 3B illustrates sequence space 300 when the sequence number window has moved forward, but the lower bound indicated by "snd.una" is not yet past the checkpoint sequence number. With sequence number window values as shown in FIG. 3B, the test of step 212 will be false and no checkpoint storage is performed. FIG. 3C shows sequence space 300 when the sequence number window has moved entirely past the checkpoint sequence number. In this scenario, step 212 will be true, and at step 214 the checkpoint sequence is re-set to the new upper bound of the sequence number window at "snd.max".

Using this approach, the checkpoint sequence number as stored in the checkpoint store always is a valid value within the then-current sequence number space. However, this approach also minimizes the number of checkpoint storage operations that need to be performed to keep the standby node in possession of a current sequence number value. In an alternative but less efficient approach, the checkpoint sequence value could be updated to the checkpoint store whenever the "snd.max" value changes.

In one embodiment, the checkpoint sequence value may be denoted using a variable name "snd.ucm" referring to "send update checkpoint marker." In other embodiments, any other suitable variable name or value name may be used.

Figure 4:
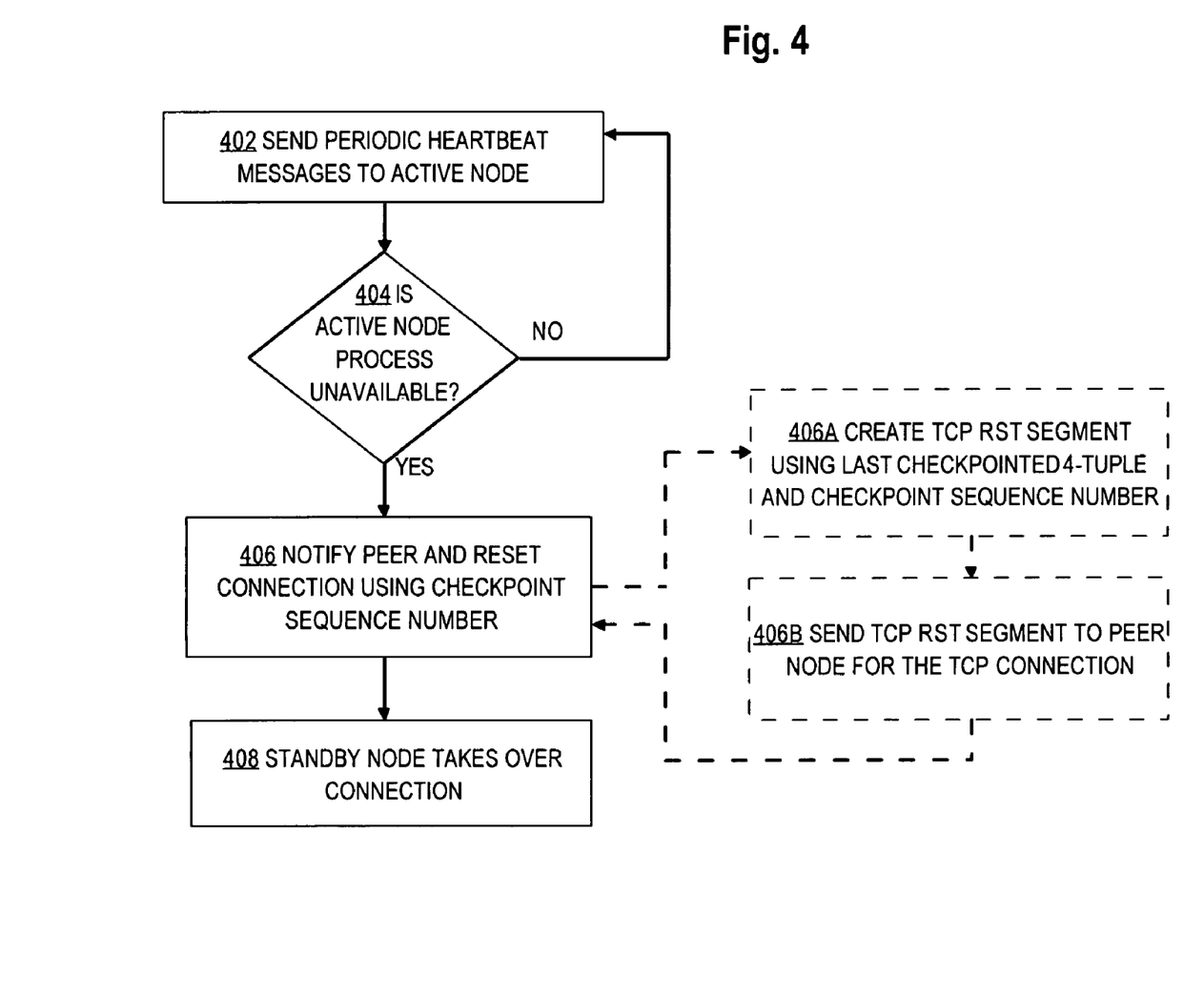
FIG. 4 is a flow diagram of one embodiment of a method of notifying a peer node that a transport connection is unavailable.

FIG. 4 is a flow diagram of one embodiment of a method of notifying a peer node that a transport connection is unavailable.

In step 402, heartbeat messages are periodically sent to the active node. For example, the fast notification process 122 of active node 102 periodically sends heartbeat messages to standby node 114 as represented by arrow 128. If the active node 102 fails to send a heartbeat message at an expected interval, then standby node 114 immediately determines that the active node is unavailable, as represented by the test of step 404. In this context, "unavailable" refers broadly to a process, application or node that is non-responsive, too slow, frozen, crashed, down, failed, or otherwise unavailable.

In response, in step 406, the fast notification process 122 of the standby node 114 notifies peer node 112 and resets the current connection using the checkpoint sequence number. For example, in a TCP embodiment, in step 406A the fast notification process 122 of standby node 114 creates a TCP RST segment that includes the last four-tuple of connection values stored in the checkpoint store, and the checkpoint sequence number. In step 406B the standby node sends the TCP RST segment to the peer node. The standby node takes over the connection as shown in step 408.

As a result, the connection is reset and the checkpoint sequence number is adopted as the current sequence number for segments communicated among the standby node 114 and the peer node 112. In a TCP implementation, steps 406A-406B cause the peer node to immediately flush the connection and place the connection in a CLOSED state, as defined by RFC 793.

As part of step 406 the fast notification process of the standby node may notify all peers that are involved in connections that were configured for fast notification at step 202.

The fact that the approach of FIG. 2 does not periodically checkpoint the "snd.nxt" value is immaterial. Assume that the active node 102 crashes, or TCP process 106 becomes available, when the checkpoint sequence value is greater than "snd.nxt". The standby node 114 then takes over the TCP connection, adopts the checkpoint sequence value as the current sequence number, and sends data with that sequence number. Standard acknowledgment and retransmission processes of TCP as specified in RFC 793 will enable the peers to re-synchronize to the correct current sequence number. The approach herein guarantees that the sequence number used at step 406 always falls within the sequence number window that the remote peer has previously advertised.

The heartbeat mechanism described for FIG. 4, in conjunction with the checkpoint approach of FIG. 2, enables a system as described herein to detect and respond to the unavailability of a connection within milliseconds rather than waiting for a long timeout period to expire and without using repeated retry operations. However, the use of a heartbeat mechanism to detect failure of an active node is not critical to an embodiment of the approaches herein, and other failure detection mechanisms may be used. Periodically polling the active node, or other mechanisms provided by an operating system of a host of the active node and the standby node, may be used. Thus, a heartbeat mechanism and the use of mirrored fast notification processes 122 are disclosed herein merely as an example of rapidly detecting when a process is unavailable.

Embodiments of this approach can provide numerous benefits in comparison to prior approaches. For example, transmitting only a single TCP RST segment is needed, unlike the approach of Appanna et al. There is no dependency on the peer and no action is required from the peer to learn an acceptable sequence value. The fast notification process herein is required to construct only a TCP RST segment in response to a failure at the active node. Since there are no incoming packets involved in notification, the fast notification process does not need to maintain state information to associate a segment with a connection.

3.0 IMPLEMENTATION MECHANISMS

Hardware Overview

Figure 5:
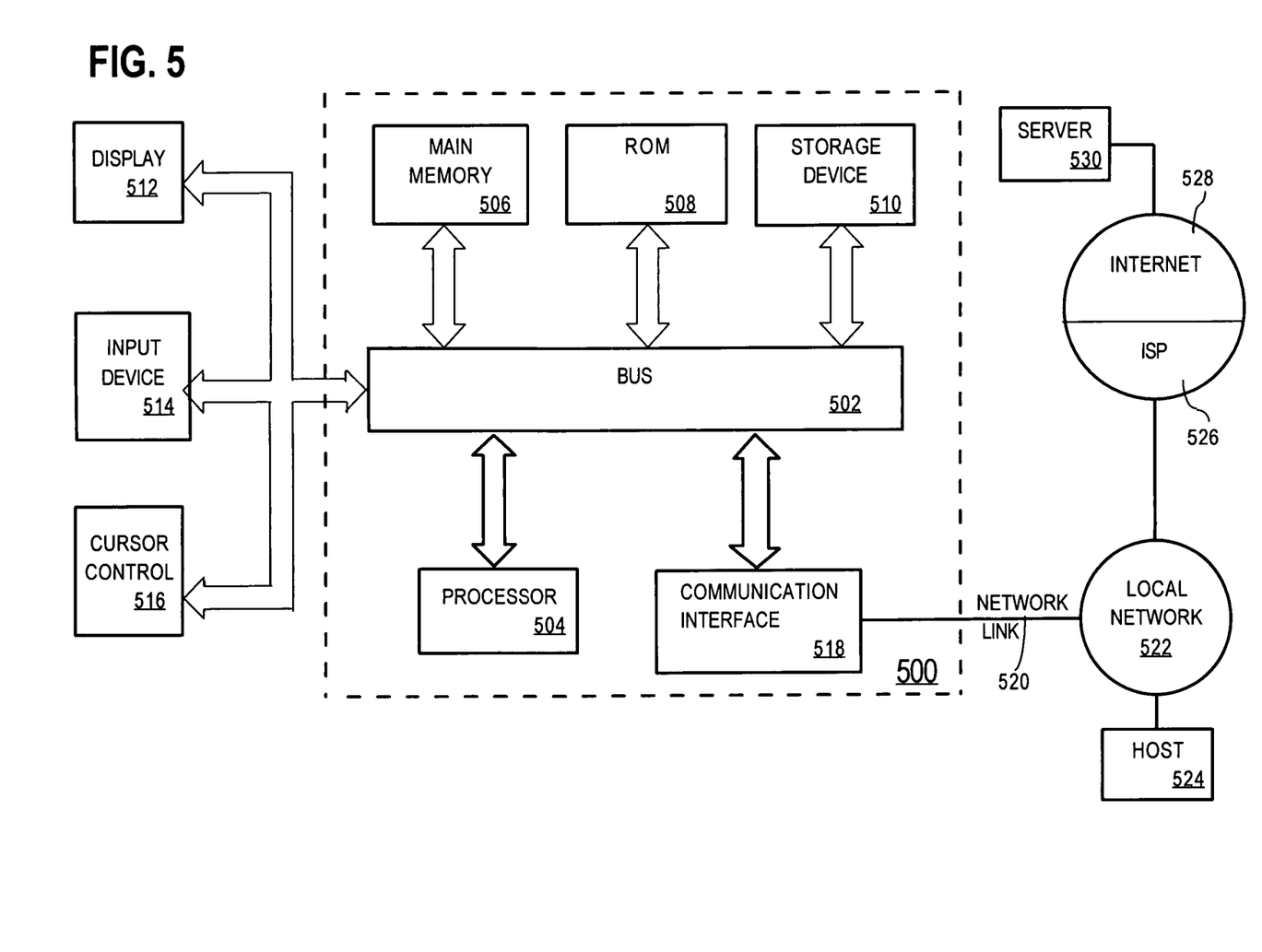
FIG. 5 is a block diagram of an example computer system with which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for detecting unavailable network connections. According to one embodiment of the invention, detecting unavailable network connections are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for detecting unavailable network connections as described herein.

The received code may be executed by processor 504 as it is received, and/or stored in storage device 510, or other non-volatile storage for later execution. In this manner, computer system 500 may obtain application code in the form of a carrier wave.

4.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   a first data processing node hosting at least one transport protocol connection that uses a plurality of sequence values to identify messages sent to a peer node, wherein the first node is communicatively coupled to a second data processing node serving as a redundant backup, periodically sending a checkpoint sequence value to the second node for each transport protocol connection of the at least one transport protocol connection;

wherein the checkpoint sequence value is a valid sequence value for identifying messages sent over said each transport protocol connection;

wherein the checkpoint sequence value is initially set equal to a maximum sequence value allowed for a window of sequence values associated with the transport protocol connection;

wherein one or more of the at least one transport protocol connection is marked for a fast notification capability;

the second node detecting, based on the one or more of the transport protocol connections marked for said fast notification capability, that either a particular transport protocol connection or a process using the particular transport protocol connection is unavailable, without use of a timeout; and the second node determining whether the particular transport protocol connection is marked for said fast notification capability;

in response to detecting that the particular transport protocol connection is unavailable and in response to determining that the particular transport protocol connection is marked for said fast notification capability, the second node sending a notification to the peer node, wherein the notification is a notification message that is identified by the checkpoint sequence value;

wherein said notification message is used to re-synchronize to a correct current sequence number for the particular transport protocol connection with the peer node.

2. A method as recited in claim 1, further comprising:
determining that a sent-unacknowledged sequence value identifying a lowest sequence value of data sent on a particular transport protocol connection but unacknowledged by the peer node is greater than the checkpoint sequence value;
only in response thereto, updating the checkpoint sequence value to a then-current maximum sequence value allowed for the window of sequence values associated with the particular transport protocol connection, and sending the updated checkpoint sequence value to the second node.

3. A method as recited in claim 1, wherein a transport protocol connection is a Transmission Control Protocol (TCP) connection, and wherein the process using the transport protocol connection is a Border Gateway Protocol (BGP) process.

4. A method as recited in claim 3, further comprising:
determining that a sent-unacknowledged (SND.UNA) value is greater than the checkpoint sequence value;
in response thereto, updating the checkpoint sequence value to a maximum sequence number (SND.MAX) value associated with the TCP connection.

5. A method as recited in claim 3, wherein sending the notification comprises sending a TCP reset/restart (RST) segment from the second node to the peer node, wherein the TCP RST segment includes the checkpoint sequence value as the sequence value of the TCP RST segment.

6. A method as recited in claim 1, wherein the detecting step is performed at the second node by periodically sending heartbeat messages from the second node to the first node.

7. A method as recited in claim 1, wherein the first node hosts a plurality of transport protocol connections.

8. A method as recited in claim 1, wherein sending a checkpoint sequence value to the second node further comprises sending a source network address value, source port value, destination address value, and destination port value in association with the checkpoint sequence value to the second node.

9. A method, comprising:
a first data processing node hosting at least one Transport Control Protocol (TCP) connection for sending messages to a peer node;
wherein a TCP connection of said at least one TCP connection uses sequence numbers to identify messages sent to the peer node, wherein the first node is communicatively coupled to a second data processing node serving as a redundant backup, setting a checkpoint sequence number equal to a maximum sequence number allowed for a window of sequence numbers associated with the TCP connection;
wherein the checkpoint sequence number is a valid sequence value for identifying messages sent over said each transport protocol connection;
wherein the TCP connection is marked for a fast notification capability;
periodically sending said checkpoint sequence number to the second node;
the second node detecting, based on said fast notification capability, that either the TCP connection or a process using the TCP connection is unavailable, without the use of a timeout;
in response to detecting that the particular transport protocol connection is unavailable and in response to the second node sending a notification to the peer node, wherein the notification is a notification message that is identified by the checkpoint sequence number;
the peer node determining that a sent-unacknowledged sequence number identifying a lowest sequence number of data sent on the TCP connection but unacknowledged by the peer node is greater than the checkpoint sequence number;
only in response thereto, the peer node updating the checkpoint sequence number to a then-current maximum sequence number allowed for file window of sequence numbers associated with the TCP connection, and sending the updated checkpoint sequence number to the second node.

10. A method as recited in claim 9, wherein the process using the TCP connection is any long-lived application running over TCP.

11. A method as recited in claim 9, wherein the process using the TCP connection is a Border Gateway Protocol (BGP) process.

12. A method as recited in claim 9, wherein the process using the TCP connection is a Label Distribution Protocol (LDP) process.

13. A method as recited in claim 9, further comprising:
determining that a sent-unacknowledged (SND.UNA) number is greater than the checkpoint sequence number;
in response thereto, updating the checkpoint sequence number to a maximum sequence number (SND.MAX) associated with the TCP connection.

14. A method as recited in claim 9, wherein sending a notification comprises sending a TCP reset/restart (RST) segment from the second node to the peer node, wherein the TCP RST segment includes the checkpoint sequence number as the sequence number of the TCP RST segment.

15. A method as recited in claim 9, wherein the detecting step is performed at the second node by periodically sending heartbeat messages from the second node to the first node.

16. A method as recited in claim 9, wherein file first node hosts a plurality of TCP connections, and wherein the steps of claim 9 are performed only for one or more of the TCP connections that are marked for said fast notification capability.

17. A method as recited in claim 9, wherein sending the checkpoint sequence number to the second node further comprises sending a source network address value, source port value, destination address value, and destination port value in association with the checkpoint sequence number to the second node.

18. A method as recited in claim 17, wherein sending the checkpoint sequence number to the second node further comprises sending any of an acknowledgment value and application-specific information in association with the checkpoint sequence number to the second node.

19. A computer-readable volatile or non-volatile medium storing one or more sequences of instructions, which instructions, when executed by one or More processors, cause the one or more processors to perform:
at first data processing node that is hosting at least one transport protocol connection that uses a plurality of sequence values to identify messages sent to a peer node, wherein the first node is communicatively coupled to a second data processing node serving as a redundant backup, periodically sending a checkpoint sequence value to the second node for each transport protocol connection of the at least one transport protocol connection;
wherein the checkpoint sequence value is a valid sequence value for identifying messages sent over said each transport protocol connection;
wherein the checkpoint sequence value is initially set equal to a maximum sequence value allowed for a window of sequence values associated with the transport protocol connection;
wherein one or more of the at least one transport protocol connection is marked for a fast notification capability;
the second node detecting, based on the one or more of the transport protocol connections marked for said fast notification capability, that either a particular transport protocol connection or a process using the particular transport protocol connection is unavailable, without use of a timeout; and
the second node determining whether the particular transport protocol connection is marked for said fast notification capability;
in response to detecting that the particular transport protocol connection is unavailable and in response to determining that the particular transport protocol connection is marked for said fast notification capability, the second node sending a notification to the peer node, wherein the notification is a notification message that is identified by the checkpoint sequence value;
wherein said notification message is used to re-synchronize to a correct current sequence number for the particular transport protocol connection with the peer node.

20. A computer-readable volatile or non-volatile medium as recited in claim 19, further comprising instructions which when executed cause:
determining that a sent-unacknowledged sequence value identifying a lowest sequence value of data sent on a particular transport protocol connection but unacknowledged by the peer node is greater than the checkpoint sequence value;
only in response thereto, updating the checkpoint sequence value to a then-current maximum sequence value allowed for a window of sequence values associated with the particular transport protocol connection, and sending the updated checkpoint sequence value to file second node.

21. A computer-readable volatile or non-volatile medium as recited in claim 19, wherein the first node hosts a plurality of transport protocol connections, and wherein the instructions of claim 19 are performed only for one or more of the transport protocol connections that are marked for said fast notification capability.

22. A computer-readable volatile or non-volatile medium as recited in claim 19, wherein the instructions that cause sending the checkpoint sequence value to the second node further comprise instructions that cause sending a source network address value, source port value, destination address value, and destination port value in association with the checkpoint sequence value to the second node.

23. An apparatus comprising:
a network interface that is coupled to a data network for receiving one or more packet flows therefrom;
a processor;
one or more stored sequences of instructions which, when executed by the processor, cause the processor to perform:
at a first data processing node that is hosting at least one transport protocol connection that uses a plurality of sequence values to identify messages sent to a peer node, wherein the first node is communicatively coupled to a second data processing node serving as a redundant backup, periodically sending a checkpoint sequence value to the second node for each transport protocol connection of the at least one transport protocol connection;
wherein the checkpoint sequence value is a valid sequence value for identifying messages sent over said each transport protocol connection;
wherein the checkpoint sequence value is initially set equal to a maximum sequence value allowed for a window of sequence values associated with the transport protocol connection;
wherein one or more of the at least one transport protocol connection is marked for a fast notification capability;
the second node detecting, based on the one or more of the transport protocol connections marked for said fast notification capability, that either a particular transport protocol connection or a process using the particular transport protocol connection is unavailable, without use of a timeout; and
the second node determining whether the particular transport protocol, connection is marked for said fast notification capability;
in response to detecting that the particular transport protocol connection is unavailable and in response to determining that the particular transport protocol connection is marked for said fast notification capability, the second node sending a notification to the peer node, wherein the notification is a notification message that is identified by the checkpoint sequence value;
wherein said notification message is used to re-synchronize to a correct current sequence number for the particular transport protocol connection with the peer node.

24. An apparatus as recited in claim 23, further comprising instructions which when executed cause:
  determining that a sent-unacknowledged sequence value identifying a lowest sequence value of data sent on a particular transport protocol connection but unacknowledged by the peer node is greater than the checkpoint sequence value;
  only in response thereto, updating the checkpoint sequence value to a then-current maximum sequence value allowed for a window of sequence values associated with the particular transport protocol connection, and sending the updated checkpoint sequence value to the second node.

25. An apparatus as recited in claim 23, wherein the first node hosts a plurality of transport protocol connections, and wherein the instructions of claim 23 are performed only for one or more of the transport protocol connections that are marked for, said fast notification capability.

26. An apparatus as recited in claim 23, wherein the instructions that cause sending the checkpoint sequence value to the second node further comprise instructions that cause sending a source network address value, source port value, destination address value, and destination port value in association with the checkpoint sequence value to the second node.

27. A computer-readable volatile or non-volatile medium storing one or more sequences of instructions, which instructions, when executed by one or more processors, cause the one or more processors to perform:
  a first data processing node hosting at least one Transport Control Protocol (TCP) connection for sending messages to a peer node;
  wherein a TCP connection of said at least one TCP connection uses sequence numbers to identify messages sent to the peer node, wherein the first node is communicatively coupled to a second data processing node serving as a redundant backup, setting a checkpoint sequence number equal to a maximum sequence numbers allowed for a window of sequence number associated with the TCP connection;
  wherein the checkpoint sequence number is a valid sequence value for identifying messages sent over said each transport protocol connection;
  wherein the TCP connection is marked for a fast notification capability;
  periodically sending said checkpoint sequence number to the second node;
  the second node detecting, based on said fast notification capability, that either the TCP connection or a process using the TCP connection is unavailable, without use of a timeout;
  in response to detecting that the particular transport protocol connection is unavailable and in response to the second node sending a notification to the peer node, wherein the notification is a notification message that is identified by the checkpoint sequence number;
  the peer node determining that a sent-unacknowledged sequence number identifying a lowest sequence number of data sent on the TCP connection but unacknowledged by the peer node is greater than the checkpoint sequence number;
  only in response thereto, the peer node updating the checkpoint sequence number to a then-current maximum sequence number allowed for the window of sequence numbers associated with the TCP connection, and sending the updated checkpoint sequence number to the second node.

28. A computer-readable volatile or non-volatile medium as recited in claim 27, wherein, the process using the TCP connection is any long-lived application running over TCP.

29. A computer-readable volatile or non-volatile medium as recited in claim 27, wherein the process using the TCP connection is a Border Gateway protocol (BGP) process.

30. A computer-readable volatile or non-volatile medium as recited in claim 27, wherein the process using the TCP connection is a Label Distribution Protocol (LDP) process.

31. A computer-readable volatile or non-volatile medium as recited in claim 27, wherein sending a notification comprises sending a TCP reset/restart (RST) segment from the second node to the peer node, wherein the TCP RST segment includes the checkpoint sequence number as the sequence number of the TCP RST segment.

32. A computer-readable volatile or non-volatile medium as recited in claim 27, wherein the detecting step is performed at the second node by periodically sending heartbeat messages from the second node to the first node.

33. A computer-readable volatile or non-volatile medium as recited in claim 27, wherein the first node hosts a plurality of TCP connections, and wherein the steps of claim 27 are performed only for one or more of the TCP connections that are marked for said fast notification capability.

34. A computer-readable volatile or non-volatile medium as recited in claim 27, wherein sending the checkpoint sequence number to the second node further comprises sending a source network address value, source port value, destination address value, and destination port value in association with the checkpoint sequence number to the second node.

35. A computer-readable volatile or non-volatile medium as recited in claim 27, wherein sending the checkpoint sequence number to the second node further comprises sending any of an acknowledgement value and application-specific information in association with the checkpoint sequence number to the second node.

36. An apparatus comprising:
  a network interface that is coupled to a data network for receiving one or more packet flows therefrom;
  a processor;
  one or more stored sequences of instructions which, when executed by the processor, cause the processor to perform:
  a first data processing node hosting at least one Transport Control Protocol (TCP) connection for sending messages to a peer node;
  wherein a TCP connection of said at least one TCP connection uses sequence numbers to identify messages sent to the peer node, wherein the first node is communicatively coupled to a second data processing node serving as a redundant backup, setting a checkpoint sequence number equal to a maximum sequence numbers allowed for a window of sequence number associated with the TCP connection;
  wherein the checkpoint sequence number is a valid sequence value for identifying messages sent over said, each transport protocol connection;
  wherein the TCP connection is marked for a fast notification capability;
  periodically sending said checkpoint sequence number to the second, node;
  the second node detecting, based on said fast notification capability, that either the TCP connection or a process using the TCP connection is unavailable, without use of a timeout;

in response to detecting that the particular transport protocol connection is unavailable and in response to the second node sending a notification to the peer node,
wherein the notification is a notification message that is identified by the checkpoint sequence number;
the peer node determining that a sent-unacknowledged sequence number identifying a lowest sequence number of data sent on the TCP connection but unacknowledged by the peer node is greater than the checkpoint sequence number;
only in response thereto, the peer node updating the checkpoint sequence number to a then-current maximum sequence number allowed for the window of sequence numbers associated with the TCP connection, and sending the updated checkpoint sequence number to the second node.

37. An apparatus as recited in claim 36, wherein the process using the TCP connection is any long-lived application running over TCP.

38. An apparatus as recited in claim 36, wherein the process using the TCP connection is a Border Gateway Protocol (BGP) process.

39. An apparatus as recited in claim 36, wherein the process using the TCP connection is a Label Distribution Protocol (LDP) process.

40. An apparatus as recited in claim 36, wherein sending a notification comprises sending a TCP reset/restart (RST) segment from the second node to the peer node, wherein the TCP RST segment includes the checkpoint sequence number as the sequence number of the TCP RST segment.

41. An apparatus as recited in claim 36, wherein the detecting step is performed at the second node by periodically sending heartbeat messages from file second node to the first node.

42. An apparatus as recited in claim 36, wherein the first node hosts a plurality of TCP connections, and wherein the steps of claim 36 are performed only for one or more of the TCP connections that are marked for said fast notification capability.

43. An apparatus as recited in claim 36, wherein sending the checkpoint sequence number to the second node further comprises sending a source network address value, source port value, destination address value, and destination port value in association with the checkpoint sequence number to the second node.

44. An apparatus as recited in claim 36, wherein sending the checkpoint sequence number to the second node further comprises sending any of an acknowledgment value and application-specific information in association with the checkpoint sequence number to the second node.

* * * * *

UNITED STATES PATENT AND TRADEMARK OFFICE
CERTIFICATE OF CORRECTION

| | | |
|---|---|---|
| PATENT NO. | : 7,903,546 B2 | Page 1 of 1 |
| APPLICATION NO. | : 11/036191 | |
| DATED | : March 8, 2011 | |
| INVENTOR(S) | : Mitesh Dalal et al. | |

It is certified that error appears in the above-identified patent and that said Letters Patent is hereby corrected as shown below:

Claim 9, Column 12, Line 42, replace "file" with --the--

Claim 16, Column 13, Line 4, replace "file" with --the--

Claim 19, Column 13, Line 22, replace "More" with --more--

Claim 20, Column 14, Line 8, replace "file" with --the--

Claim 29, Column 16, Line 6, replace "protocol" with --Protocol--

Signed and Sealed this

Seventeenth Day of May, 2011

David J. Kappos
*Director of the United States Patent and Trademark Office*